(12) United States Patent
Williams et al.

(10) Patent No.: US 9,547,471 B2
(45) Date of Patent: Jan. 17, 2017

(54) GENERATING COMPUTER RESPONSES TO SOCIAL CONVERSATIONAL INPUTS

(71) Applicant: Microsoft Corporation, Redmond, WA (US)

(72) Inventors: Jason Williams, Seattle, WA (US); Geoffrey Zweig, Sammamish, WA (US); Aparna Lakshmiratan, Kirkland, WA (US); Carlos Garcia Jurado Suarez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 14/323,050

(22) Filed: Jul. 3, 2014

(65) Prior Publication Data

US 2016/0005395 A1     Jan. 7, 2016

(51) Int. Cl.

| | | |
|---|---|---|
| *G10L 15/00* | (2013.01) | |
| *G06F 3/16* | (2006.01) | |
| *G10L 15/22* | (2006.01) | |
| *G06F 17/27* | (2006.01) | |
| *G06F 17/30* | (2006.01) | |
| *G10L 15/18* | (2013.01) | |

(52) U.S. Cl.
CPC ............ *G06F 3/167* (2013.01); *G06F 17/279* (2013.01); *G06F 17/30654* (2013.01); *G10L 15/1822* (2013.01); *G10L 15/22* (2013.01); *G10L 2015/223* (2013.01); *G10L 2015/226* (2013.01)

(58) Field of Classification Search
USPC .......................... 704/232, 251, 243, 270, 257
See application file for complete search history.

(56) References Cited

U.S. PATENT DOCUMENTS

| | | | |
|---|---|---|---|
| 7,280,965 B1 | 10/2007 | Begeja et al. | |
| 7,412,383 B1 | 8/2008 | Alonso et al. | |
| 7,958,068 B2 * | 6/2011 | Smith .................. | G06K 9/6292 706/20 |

(Continued)

FOREIGN PATENT DOCUMENTS

WO     2013155619 A1     7/2013

OTHER PUBLICATIONS

Ye et al. "Sentiment classification of online reviews to travel destinations by supervised machine learning approaches", Expert Systems with Applications 36, pp. 6527-6535, published in 2009.*

(Continued)

*Primary Examiner* — Edgar Guerra-Erazo
(74) *Attorney, Agent, or Firm* — Alin Corie; Sandy Swain; Micky Minhas

(57) ABSTRACT

Conversational interactions between humans and computer systems can be provided by a computer system that classifies an input by conversation type, and provides human authored responses for conversation types. The input classification can be performed using trained binary classifiers. Training can be performed by labeling inputs as either positive or negative examples of a conversation type. Conversational responses can be authored by the same individuals that label the inputs used in training the classifiers. In some cases, the process of training classifiers can result in a suggestion of a new conversation type, for which human authors can label inputs for a new classifier and write content for responses for that new conversation type.

20 Claims, 6 Drawing Sheets

(56) References Cited

U.S. PATENT DOCUMENTS

| | | | |
|---|---|---|---|
| 7,987,188 B2* | 7/2011 | Neylon | G06F 17/30616 706/12 |
| 8,086,549 B2 | 12/2011 | Qi et al. | |
| 8,239,189 B2* | 8/2012 | Skubacz | G06F 17/2785 704/10 |
| 8,321,220 B1* | 11/2012 | Chotimongkol | G10L 15/063 704/10 |
| 8,356,030 B2* | 1/2013 | Neylon | G06F 17/30616 707/721 |
| 8,554,701 B1* | 10/2013 | Dillard | G06N 99/005 706/12 |
| 8,589,317 B2 | 11/2013 | Paquet et al. | |
| 9,104,655 B2* | 8/2015 | Kyaw | G06N 5/022 |
| 9,129,008 B1* | 9/2015 | Kuznetsov | G06F 17/30616 |
| 9,158,761 B2* | 10/2015 | Taylor | G06F 17/274 |
| 2004/0172238 A1* | 9/2004 | Choo | G10L 15/04 704/202 |
| 2004/0204940 A1 | 10/2004 | Alshawi et al. | |
| 2007/0067159 A1 | 3/2007 | Basu et al. | |
| 2007/0136062 A1* | 6/2007 | Braunschweiler | G10L 13/10 704/253 |
| 2008/0201145 A1* | 8/2008 | Chen | G10L 13/08 704/244 |
| 2008/0249764 A1* | 10/2008 | Huang | G06F 17/2785 704/9 |
| 2009/0119102 A1 | 5/2009 | Bangalore et al. | |
| 2009/0125371 A1* | 5/2009 | Neylon | G06F 17/30616 707/739 |
| 2009/0157571 A1* | 6/2009 | Smith | G06K 9/6292 706/12 |
| 2011/0106807 A1* | 5/2011 | Srihari | G06F 17/30604 707/739 |
| 2011/0208522 A1* | 8/2011 | Pereg | G06F 17/279 704/235 |
| 2011/0252036 A1* | 10/2011 | Neylon | G06F 17/30616 707/739 |
| 2012/0253792 A1* | 10/2012 | Bespalov | G06F 17/30707 704/9 |
| 2015/0019204 A1 | 1/2015 | Simard | |
| 2015/0019211 A1 | 1/2015 | Simard | |
| 2015/0019460 A1 | 1/2015 | Simard | |
| 2015/0019461 A1 | 1/2015 | Simard | |
| 2015/0019463 A1 | 1/2015 | Simard | |
| 2015/0242761 A1 | 8/2015 | Amershi | |

OTHER PUBLICATIONS

Bespalov, "Sentiment Classification Based on Supervised Latent n-gram Analysis", in Proceedings of the 20th ACM International Conference on Information and Knowledge Management, Oct. 24, 2011, pp. 375-382.*

Patra, et al., "A Fast Cluster-Assumption Based Active-Learning Technique for Classification of Remote Sensing Images", in IEEE Transactions on Geoscience and Remote Sensing, vol. 49, Issue 5, May 2011, 10 pages.

Vaassen, et al., "Automatic Emotion Classification for Interpersonal Communication", in Proceedings of the 2nd Workshop on Computational Approaches to Subjectivity and Sentiment Analysis, Jun. 24, 2011, 7 pages.

Lasecki, et al., "Chorus: A Crowd-Powered Conversational Assistant", in Proceedings of the 26th annual ACM symposium on User interface software and technology, Oct. 8, 2013, 12 pages.

"International Search Report and Written Opinion Issued in PCT Application no. PCT/US2015/038923", Mailed Date: Jan. 22, 2016, 21 Pages.

Haffner, et al., "Optimizing SVMS for Complex Call Classification", in Proceedings of IEEE International Conference on Acoustics, Speech, and Signal Processing, vol. 1, Apr. 6, 2003, 4 Pages.

Gorin, et al., "Automated Natural Spoken Dialog", in Proceedings of IEEE Computer Society, vol. 35, Issue 4, Apr. 1, 2002, pp. 51-56.

Tur, et al., "Active Learning for Spoken Language Understanding", in Proceedings of the International Conference on Acoustics, Speech, and Signal Processing, vol. 1, Apr. 6, 2003, pp. 1-276-1-279.

* cited by examiner

GENERATING COMPUTER RESPONSES TO SOCIAL CONVERSATIONAL INPUTS

BACKGROUND

It is a challenge to make a computer provide appropriate conversational responses to conversational inputs from individuals, i.e., natural language input that is conversational, such that the computer's responses create an engaging user experience. Part of the challenge is understanding an input, given variations inherent in natural language. Another part of the challenge is ensuring that any response to the input is appropriate. Many factors affect whether a response is considered appropriate, such as vocabulary selection, tone, consistency with a "personality" or branding, and whether the response is entertaining, witty, engaging, not offensive, and the like.

In some systems, this challenge is addressed by manually specifying patterns, such as by using regular expressions, and associating human authored content to those patterns. If an input matches a regular expression, then content associated with the matched regular expression can be provided as a response. Such systems are developed by people with specialized skills in writing and analyzing regular expressions, typically computer programmers, and yet other people with skills in writing appropriate content for responses, typically content editors.

In some systems, this challenge is addressed by automatically generating responses by mining conversations from a large data set. If an input matches an input of one or more prior conversations, then a response can be automatically generated based on any responses to that input from the prior conversation(s). In such a system, the automatically generated response is not vetted by a human prior to the computer producing the response, which increases the risk of generating an inappropriate response.

SUMMARY

This Summary is provided to introduce a selection of concepts in a simplified form that are further described below in the Detailed Description. This Summary is intended neither to identify key or essential features, nor to limit the scope, of the claimed subject matter.

Conversational interactions between humans and computer systems can be provided by a computer system that classifies an input by conversation type, and provides human authored responses for conversation types. The input classification can be performed using trained binary classifiers. Training can be performed by labeling inputs as either positive or negative examples of a conversation type. Conversational responses can be authored by the same individuals that label the inputs used in training the classifiers. In some cases, the process of training classifiers can result in a suggestion of a new conversation type, for which human authors can label inputs for a new classifier and write content for responses for that new conversation type.

The invention may be embodied as a computer system, as any individual component of such a computer system, as a process performed by such a computer system or any individual component of such a computer system, or as an article of manufacture including computer storage with computer program instructions are stored and which, when processed by computers, configure those computers to provide such a computer system or any individual component of such a computer system.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section describes an example operating environment of a computer that supports generating responses to conversational inputs.

Figure 1:
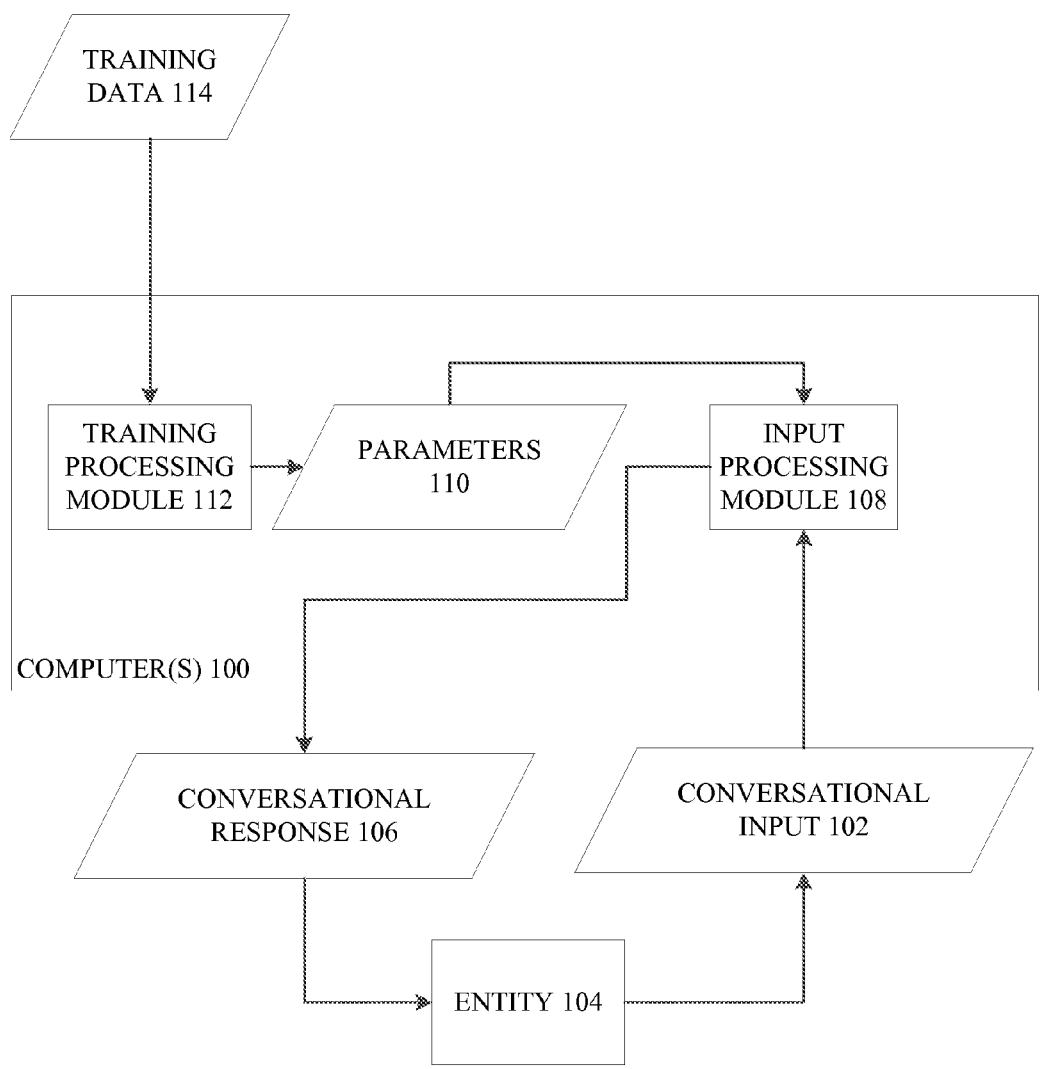
FIG. 1 is a block diagram of an example application environment in which a computer system supports generating responses to conversational inputs.

Referring to FIG. 1, a computer 100 receives conversational input 102 from an entity 104. The conversational input 102 comprises data that are intended to convey meaning to a recipient of the input. The conversational input can be received through any of a variety of devices and processing. A simple example of a conversational input is "What is the weather today in Seattle?".

In response to the conversational input 102, the computer 100 generates a conversational response 106. The conversational response 106 comprises data that are intended to convey meaning to the entity 104 that provided the conversational input 102. The conversational response 106 can be delivered to the entity 104 through any of a variety of devices and processing. A simple example of a conversational response is "It is raining today in Seattle."

Figure 2:
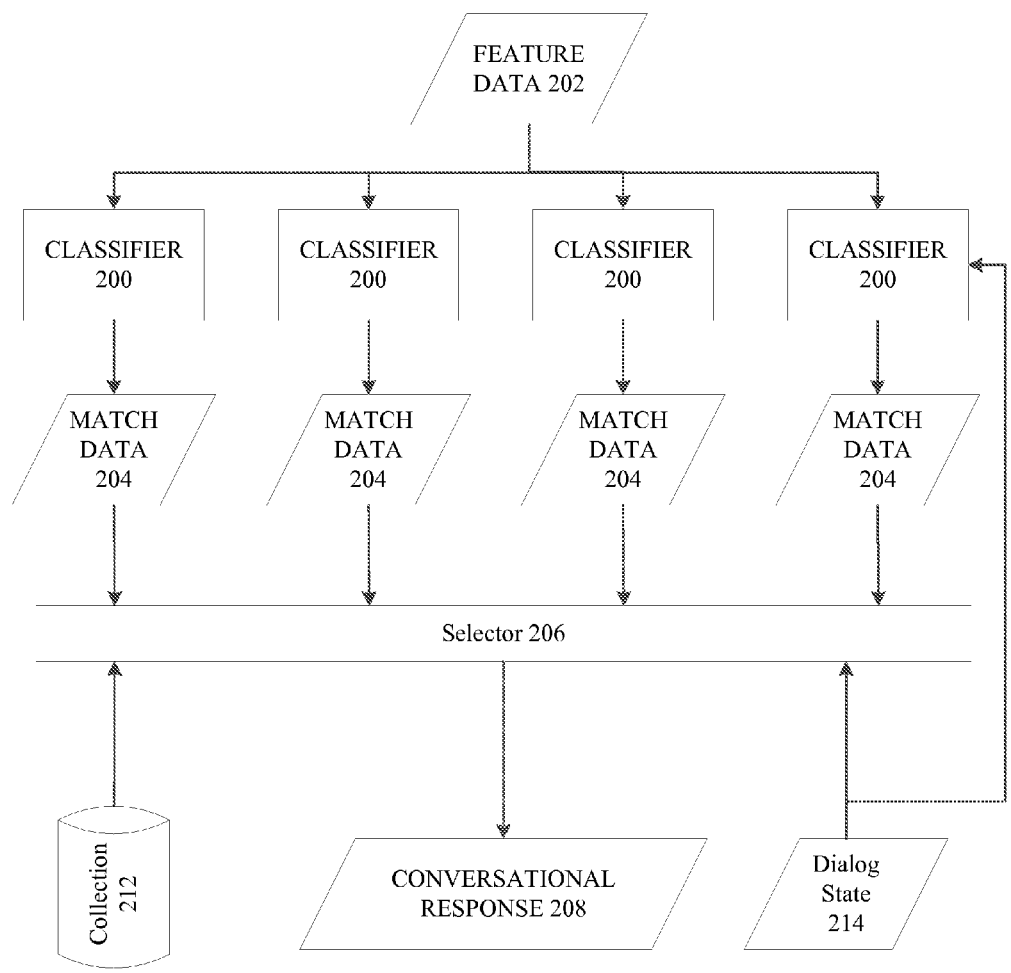
FIG. 2 is a data flow diagram describing an example implementation of an input processing module.

To produce the conversational response, the computer 100 includes an input processing module 108, an example implementation of which is described in more detail below in connection with FIGS. 2 and 3.

The input processing module 108 has parameters 110 that are set using a training process. The training process is implemented through a training processing module 112. The training processing module has inputs that receive training data 114 and outputs that provide the parameters 110. An example implementation of a training processing module is described in more detail below in connection with FIGS. 4 and 5.

In FIG. 1, the computer 100 includes both the input processing module 108 and the training processing module 112. The computer 100 can include one or more distinct general purpose computers or other distinct computing devices, each of which can include one or more processors or processing devices. Thus, the modules 108 and 112 can be on the same computing device or on separate computing devices, or portions thereof can be on the same computing device. Each module 108 and 112 can be on one or more computing devices.

In FIG. 1, in one implementation, the training processing module 112 can directly update parameters of the input processing module. In another implementation, the training processing module can produce updated parameters separate from the input processing module, and then transfer the updated parameters in the input processing module from time to time.

In some implementations, training by the training processing module can occur once. In other implementations, training can be performed as an ongoing process and the parameters of the input processing module can be updated from time to time, such as periodically.

The training processing module can produce one set of parameters that are used by, and thus shared by, multiple different input processing modules on different computing devices. Multiple different training processing modules can produce different sets of parameters, whether for different input processing modules or to be selected from and used by one input processing module, for example for different situations for an end user or for different end users.

FIG. 1 also shows the computer 100 receiving conversational inputs 102 and providing conversational responses 106 to an entity 104. The entity 104 typically is an individual.

The conversational inputs 102 typically are one or more words or phrases in a natural language. Other inputs can include, but are not limited to, symbols conventionally used to communicate meaning, but which may not be formally recognized as part of a natural language, such as mathematical symbols, emoticons, and the like. Other data related to the conversational inputs can include gesture data from an input device, sensor data from wearable sensors and environmental sensors, image data, video data and/or audio data, from which various metadata also can be extracted. Metadata related to an entity's gestures, tone of voice, facial expressions, possible emotions and the like, can be useful.

Such inputs can be provided in many ways. For example, the entity can type on a keyboard. The entity can speak into a microphone and the computer 100 can perform speech recognition. The entity can provide image or video data and the computer 100 can perform image recognition or other image processing. The entity can provide text data and the computer 100 can process the text to extract words and phrases.

The conversational responses 106 typically are one or more words or phrases in a natural language. Other inputs can include, but are not limited to, symbols conventionally used to communicate meaning, but which may not be formally recognized as part of a natural language, such as mathematical symbols, emoticons, and the like. Other data also can be generated for various purposes related to communication of the response to the user.

Such conversational outputs can be provided in many ways. For example, the responses can be displayed as text on a display screen. The responses can be processed using speech generation to provide audio data that is played on speakers or headphones. The responses can be converted to other image data, if the responses are not limited to text, and the image data can be displayed. For example, such image data can include an avatar of an entity showing gestures and facial expressions for the entity. Other output formats can be generated depending on the desired interaction format selected by the user (such as Braille, printing or other types of output devices).

The computer 100, or parts thereof, can be part of a device (not shown) that can be used by the entity 104, or can be separate from a device used by the entity 104.

For example, the entity may use a hand held device, such as a mobile phone, with a microphone, speaker and keyboard, possibly on a touch screen display. Such a hand held device typically includes a computer. In one implementation, the computer on the hand held device can include the input processing module 108. In another implementation, the hand held device can communicate conversational inputs 102 to the input processing module on another computing device; in turn, the other computing device can provide the conversational response 106 to the hand held device. The connection between the hand held device and the other computing device can be over any kind of data communication network, such as a public computer network, cellular telephone connection, or the like. Similar to a hand held device, a wearable computing device, taking a form of a wristband, watch, earpiece or glasses, also can have a similar configuration.

As another example, the entity may be in an automobile or other vehicle, which may have a microphone and speaker, and possible other input and output devices. The vehicle can include an onboard computer that processes inputs from and provides outputs to various devices in the vehicle. In one implementation, the onboard computer can include the input processing module 108. In another implementation, the onboard computer can communicate input data to an input processing module on another computing device in wireless communication with the onboard computer, such as through a cellular telephone connection or a satellite communication connection. In turn, the other computing device can transmit the conversational response 106 to the onboard computer.

As another example, the entity may be in a home environment using a home entertainment system that can include many devices, including but not limited to a game console, a set top box, a smart television or other display, and one or more hand held devices, such as smart phones, tablet computer and/or remote controls. Any one or more of these devices can include one or more input devices, such as a microphone, keyboard, or touch screen display from which a conversational input can be received from an entity in the environment. Any one or more of these devices in the same environment also can include one or more output devices, through which a conversational response can be provided to the entity. The computer on one or more of these devices can include the input processing module 108. This computer can be in a different device than the device that includes either the input devices and/or the output devices. The connection among the various devices can be over any kind of data communication network, including but not limited to a private local area network, a wireless communication connection, a cellular telephone connection, or the like.

Having now described example operating environments, more details of an example implementation of the input processing module 108 in FIG. 1 will now be described in connection with FIGS. 2 and 3.

The input processing module includes a plurality of classifiers 200, each classifier being for a different conversation type. Each classifier has an input that receives feature data 202 derived from the input data. Each classifier has an output that provides match data 204 indicative of whether the feature data applied to the input of the classifier matches the conversation type for the classifier. Each classifier has parameters, which are distinct from the parameters of the other classifiers, and which are set in response to the training process.

Any of a variety of types of pattern classifiers can be used in the input processing module, such as decision trees, neural networks, vector machines, and the like. In general, a pattern classifier receives an input, defined by a plurality of features, and provides an output indicating how well the input matches patterns that the classifier has been trained to match. In general, the output is a score within a defined range, such as 0 to 1, which is computed using a form of similarity or distance metric or probability measure. Parameters of the classifiers, such as parameters of the similarity or distance or probability metric, are set through a training process. In one example implementation, the classifier can be implemented using a binary classifier that uses a logistic regression classification method.

The features used by the classifiers generally are canonical forms into which an input is converted. For conversational inputs, such features can include information such as forms of words in the conversational input, the sequence of those words, n-grams of those words, and other related information, such as source of the conversational input, any emotional or tonal cues that may be available, environmental data, related keywords and the like. As one example, features can include all of the words present, n-grams of the words (e.g., 2 or 3-word sequences such as, for "how old are you?", example n-grams are how_old, old_are, are_you, etc.), the length of the utterance in words, the part of speech of each word (e.g., "old" is an adjective), embeddings (numbers) that describe similar sets of words, a parse tree describing the input, etc.

A selector 206 has inputs connected to receive the match data 204 from the classifiers 200. The selector has an output that provides a conversational response 208, from a collection 212 of conversational responses for each conversation type, based on the match data 204 received from the classifiers. The conversational response 208 can be generated in a variety of ways.

In one example implementation, the match data 204 output by a classifier is a score computed by the classifier, and the selector 206 selects the conversation type corresponding to the classifier producing the best score. As another example, all classifiers producing scores within a range of the best score can be considered. Selecting multiple classifiers is particularly useful if there is a hierarchy of conversation types. If a classifier of a more general type and a classifier of a more specific type both produce suitable match scores, the conversation type can be selected based on the classifier with the more specific conversation type. A threshold can be applied to all of the scores to ensure that the scores are sufficiently high to indicate the presence of a conversational input. In turn, the selector accesses the collection 212 of conversational responses to select a conversational response from among those stored for the selected conversation type. The selection of a conversational response from a set can performed in a variety of ways, such as a random, pseudo-random, quasi-random selection, round robin selection, least recently used, feedback and ratings of the responses and so on.

The collection 212 of conversational responses for each conversation type is, in general, created by individuals with experience in creating content for such services. These human authored responses, as described in more detail below, can be created by individuals that also participate in training the classifiers by providing labels to the inputs of classifiers. The labels applied to a conversational input indicate whether the conversational input is a positive or negative example of the conversation type. The collection 212 stores conversational responses in a manner that associates each conversational response with a conversation type. Thus, the collection 212 is a set of data representing conversational response/conversation type pairs, which can be stored in any of a variety of ways that allows ready access and selection of a conversational response given a conversation type. The conversational responses generally are represented using a string of characters, which can be limited in length to a certain number of characters to provide a consistent storage format. A conversation type can be represented with any identifier, such as an alphanumeric identifier, which can be associated, whether directly or indirectly, with a classifier for that conversation type.

Any of a variety of other techniques can be used to select a conversational response from the collection 212 based on the match data 204 output by a set of classifiers.

In some implementations, information describing a dialog state 214 also can be stored, and in turn used by the selector 206 or classifiers 200. The dialog state can be data describing one or more previous conversational inputs, conversational responses and conversation types. Such information is illustrated as being provided by the selector 206, but also can be provided by classifiers 200 or another component of the system specifically designed to track conversation state. Such information is illustrated is being provided to one of the classifiers, but can be provided to all of the classifiers, a subset of the classifiers or none of the classifiers. In some implementations, the conversation state can be treated as a feature 202 applied to the classifiers. The classification of a conversation type for a currently processed conversational input can be affected by the dialog state 214. Alternatively, or in combination, the selection of a conversation type and conversational response for a currently processed conversational input can be affected by the dialog state 214. As a practical example, if the conversational input is "What is the weather like today in Philadelphia?", a weather-related conversational response is generated. If the next conversational input is "How about tomorrow?", then the dialog state information 214 can be used to ensure that a weather-related conversational response is generated. For example, information about conversation type hierarchy can be combined with dialog state information to make such a selection.

Figure 3:
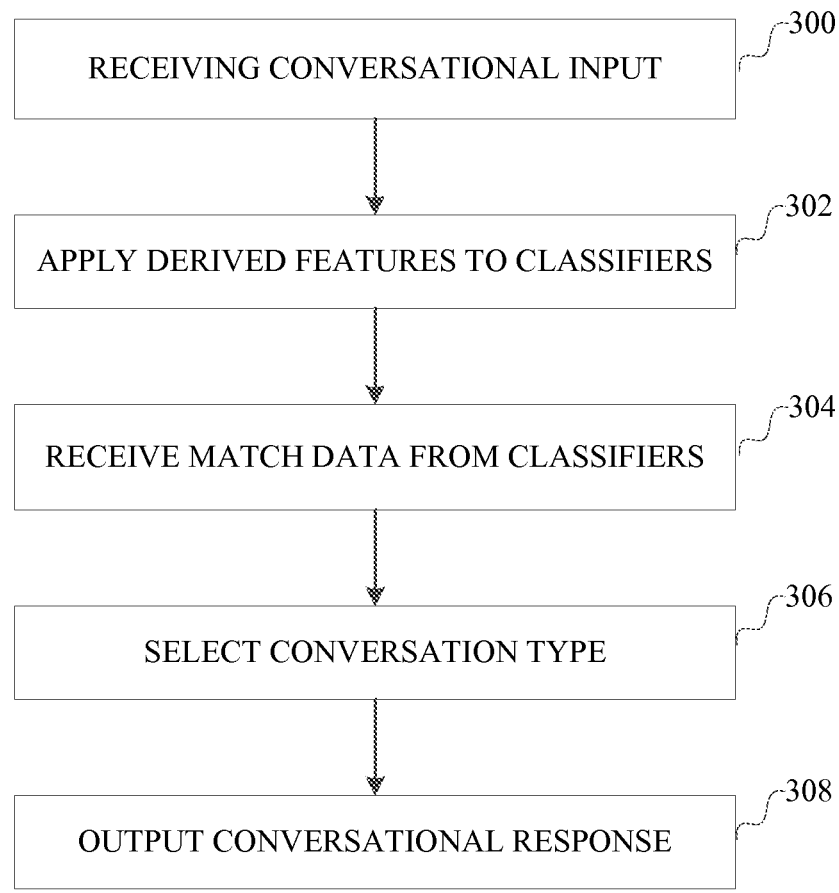
FIG. 3 is a flowchart describing an example operation of an input processing module.

A flowchart in FIG. 3 describes operation of this example input processing module.

In FIG. 3, the operation begins with receiving 300 a conversational input. Features derived from the conversational input are applied 302 to the inputs of a plurality of classifiers. Match data is received 304 from the plurality of classifiers and used to select 306 a conversation type. A conversational response is then output 308 based on the selected conversation type.

Having now described the input processing module, an example implementation of a training process for the classifiers will now be described in more detail.

In one implementation, a conventional training process for a conventional classifier is used, starting with a known, finite set of conversation types and corresponding examples. Using random sampling or some other approach, the examples are applied to the classifier, and the parameters of the classifier are adjusted based on errors between the output of the classifier and the examples applied to the classifier. After a classifier is trained for a given conversation type, it can be used to generate conversational responses.

In one implementation, the classifier can be a binary classifier, which can be trained using an active learning process. In such a process, training begins by selecting 400 a set, e.g., ten, of positive examples and a set, e.g., ten, of negative examples of conversational inputs. A positive example is a conversational input that matches the conversation type of the classifier. For example if the conversation type for the classifier is "Question about today's weather in a location", then "What is the weather in Seattle today?" is a positive example; "How old are you?" is a negative example. In one implementation using a binary classifier, the labels of "0" or "1" are applied to the example utterances, where "1" indicates the classifier should fire on this utterance, and "0" indicates the classifier should not fire.

A classifier is initialized 402 by setting the initial parameters of the classifier using the set of positive and negative examples using conventional techniques. Given an initialized classifier, training is performed by applying 404 a training set of conversational inputs (each one being called a training input) to the classifier. The training set can be collected from various sources, such as actual conversational inputs that have been stored in connection with a service. In this example, the training inputs are features derived from actual conversational inputs. Each training input results in a score from the classifier. If the result is clearly a positive or negative example, i.e., within a threshold amount of either extremum of the range of scores, it is possible to automatically mark the training input; however such automatic labeling can produce and then reinforce errors and is not preferred. Otherwise, any training inputs with ambiguous results, neither a positive match or negative match, are presented 406 to an individual for labeling as either positive or negative examples of the conversation type for this classifier. The classifier is then updated 408 using the labeling of these additional training inputs. The process can then be repeated one or more times as indicated by the arrow to step 404.

Figure 4:
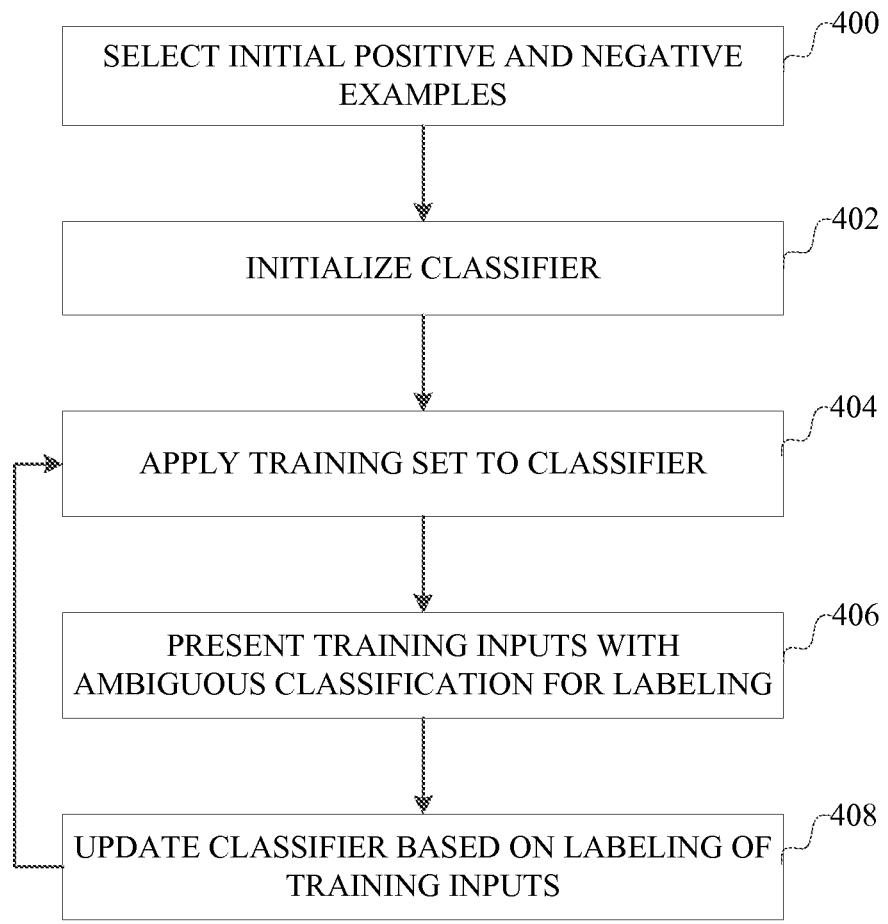
FIG. 4 is a flowchart describing an example implementation of a training process.
Figure 5:
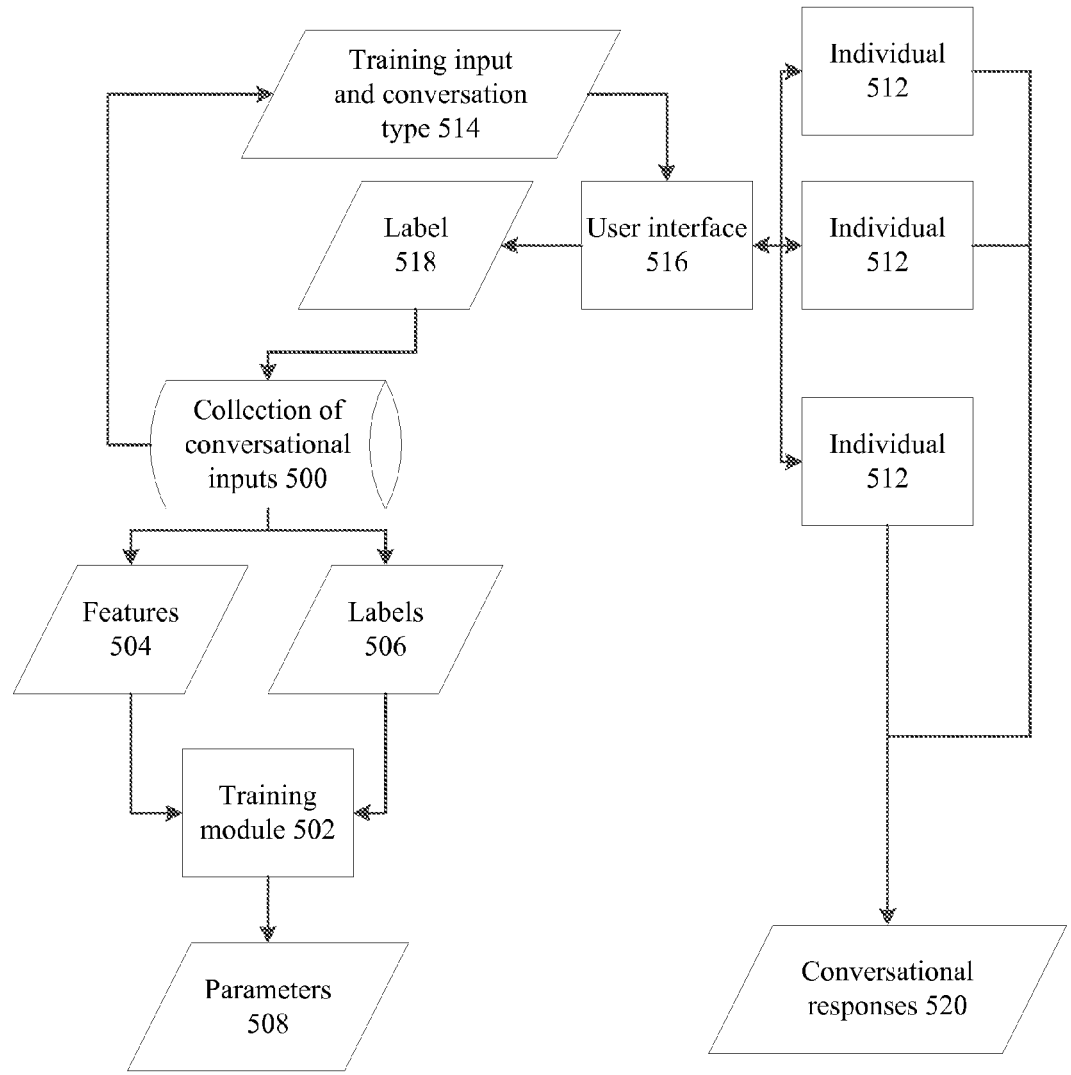
FIG. 5 is a data flow diagram of an example implementation of a training processing module.

FIG. 5 is a data flow diagram of an example implementation of a training processing module used in the operation described in FIG. 4. In FIG. 5, a collection 500 of conversational inputs is stored in computer-readable storage. Each stored input is called a training input. A training input can be associated with a label and corresponding conversation type. With multiple training types, a training input can be associated with multiple labels. A training module 502 receives features 504 derived from conversational inputs and labels 506. These are used to set parameters 508 for a classifier 510 for a conversation type.

The labels are generally input by individuals 512 that review training inputs, and label them as positive or negative examples of a conversation type. An individual 512 is presented with a training input and an indication of a conversation type (shown at 514) through a user interface 516 on a user device. The individual provides a label 518 for that training input through the user interface 516.

The individuals 512 also can provide, whether through user interface 516 or another user interface, whether on a same or different user device, the conversational responses 520 for the conversation types. These conversational responses are stored in the input processing module, such as shown in FIG. 2.

By having the same individuals prepare both the conversational responses and the labels of the conversational inputs, the system has a higher likelihood of having responses that are appropriate for the given inputs. Such capability is provided by having classifiers by conversation type trained using labeled inputs, and conversational responses selected by conversation type. In other words, the computer provides appropriate responses to conversational inputs because the individuals that generate the conversational responses are the same individuals providing labels for conversational inputs. By using classifiers per conversation type trained by positive and negative examples of labeled conversational inputs, a content editor can be both labeler and editor.

Using a large corpus of conversational inputs, the computer can identify possible conversation types by using various forms of clustering algorithms. Samples for training can be selected based on the conversation types in which the utterances are placed, and new conversation types also can be identified. A clustering algorithm can group similar conversational inputs into a set, resulting in multiple different sets with each set having similar conversational inputs. Samples from a set can be used as positive examples for a corresponding conversation type for that set, which samples from other sets can be used as negative examples.

As one example implementation automatic clustering includes applying k-means to vector-space representations of utterances, for example using bag-of-word vectors, or projections of utterances using latent semantic analysis (LSA) or latent dirichlet allocation (LDA). In another example implementation, existing classifiers can be used, and utterances for which a classifier fires, i.e., utterances of a known conversation type, are excluded; remaining utterance that do not cause a classifier to fire can be associated with a new conversation type.

In an implementation, the classifiers also can be extended to include classes of words and phrases for social conversation. Conversation types, as noted above, can be grouped into hierarchies. Such hierarchies can be based on keywords associated with conversational inputs or other class information that is derived from sets of conversational inputs. Such classes can be automatically identified, for example, using automatic clustering. As a particular example, automatic clustering can be performed by projecting words into a continuous space, and clustering in that continuous space. For example, projecting can be performed using LSA, LDA, or word embeddings learned with neural networks, and then clustering can be performed using k-means. Another method for introducing classes is for the content editor to provide example words/phrases, and to automatically extend the class. For example, if the content editor provided "born", "grow up", "childhood", more terms can be added automatically like "raised in", "I'm from", "went to school in". Semi-supervised variants of clustering techniques (such as LSA, LDA, or word embeddings) also can be used.

In one aspect, a conversational input is processed using a means for selecting a conversational response based on applying features derived from the conversational input to a plurality of classifiers. Each classifier is associated with a conversation type. Conversational responses also are associated with conversation types.

In another aspect, a conversational input can be processed by receiving input data representing a conversational input into memory. Feature data derived from the input data can be applied to a plurality of classifiers, each classifier representing a conversation type from among a plurality of conversation types. Classifiers output match data in response to input feature data. A conversational response is selected according to one or more conversation types from among the plurality of conversation types according to the match data output by the classifiers.

In any of the foregoing aspects in this section, the features can include n-grams generated from the conversational input. Such features can include data indicative of emotion related to the conversational input. Such features can include data indicative of one or more classes for subject matter of the conversational input.

In any of the foregoing aspects in this section, each classifier can be a binary classifier such that the match data output in response to the feature data represents a probability that the feature data matches a conversational input labeled as being a positive example of the conversation type associated with the binary classifier.

In any of the foregoing aspects in this section, the feature data can be derived from the conversational input and other information associated with the conversational input.

In any of the foregoing aspects in this section, the conversational response can be selected from a collection that stores a plurality of conversational responses for the plurality of conversation types.

In any of the foregoing aspects in this section, one or more conversation types can be selected from among the plurality of conversation types according to the match data output by the classifiers. The conversational response can be selected according to the selected one or more conversation types. The one or more conversation types can be selected based on scores from among the match data output by the classifiers.

In any of the foregoing aspects in this section, each classifier can output a score. The score can be within any range of values, with certain values indicating a match of the features to the conversation type represented by the classifier, with certain values indicating absence of a match. The values indicating a match can be an extremum of the range, such as maximum values in the range. The score, alternatively, can indicate a probability of a match to the conversation type.

In any of the foregoing aspects of this section, dialog state information can be maintained. A conversational response can be selected based also on the maintained dialog state information. A conversational response can be selected based also on the maintained state information and conversation type hierarchy information.

In any of the foregoing aspects in this section, the input from an entity of a conversational input and the output to that entity of the conversational response can be performed on one or more devices separate from other devices and computers that generate features from the conversational input, apply those features to classifiers, and select the conversational response. In such a case the device that receives inputs is connected to one or more computers to transmit information about the conversational inputs. Similarly, the device that receives transmissions with information about the conversational responses is connected to one or more computer to receive such transmissions. Each such device or computer includes memory, an input through with input data is received, a processor configured to process the input data, and an output through which output data can be provided to another device or computer.

In any of the foregoing aspects in this section, the device or devices used by the entity to provide a conversational input and receive a conversational response can be any of a number of devices, including, but not limited to, a mobile phone, tablet computer, hand held computing device, automobile-based computer, laptop computer, portable computer, server computer, notebook computer, slate computer, desktop computer, home entertainment system, game console, set top box for cable satellite or other television reception, television, smart display device, and the like.

In any of the foregoing aspects, a classifier can be trained to classify conversational inputs into a conversation type. Such a training process can be implemented by labeling a first number of conversational inputs as positive examples of the conversation type and a second number of conversational inputs as negative examples of the conversation type. The classifier is built using the labeled conversational inputs. A corpus of conversational inputs is accessed. The conversational inputs from the corpus are applied to the classifier to obtain an output for each conversational input from the classifier. Additional conversational inputs are presented to one or more individuals for labeling based on outputs from the classifier for the conversational inputs. Labels are received from the one or more individuals for the presented additional conversational inputs. The classifier is retrained using the additional labeled conversational inputs.

In any of the foregoing aspects of this section involving training of classifiers, the classifiers can be trained using a process that repeats steps of applying, presenting, receiving and retraining, using the retrained classifier.

In any of the foregoing aspects, conversational responses, for the conversation type associated with the classifier for which one or more individuals performed the labeling, can be received from the individuals that performed the labeling.

In any of the foregoing aspects, additional conversation types can be identified from the corpus of conversational inputs. For example, conversational inputs in the corpus can be clustered, and a conversation type can be assigned to the clusters. As another example, conversational inputs can be applied to a plurality of classifiers. The conversational inputs for which none of the plurality of classifiers indicates a match are identified. One or more new conversation types are assigned to the identified conversational inputs.

In any of the foregoing aspects, presenting conversational inputs for labeling can include selecting the additional conversational inputs to be presented according to whether the output of the classifier indicates that the additional conversational input to the classifier is neither a positive match nor negative match.

In any of the foregoing aspects, the conversation type of a classifier can be included in a hierarchy of conversation types. A conversation type can be selected based on classifiers with a score above a threshold, and a more specific conversation type is selected over a more general conversation type. Automatically clustering the corpus of conversational inputs can provide class information for the conversational inputs.

Any of the foregoing aspects of this section can be embodied in one or more computer systems, as any individual component or components of such a computer system, as a process performed by one or more of such computer systems or any individual component of such a computer system, or as one or more articles of manufacture including computer storage with computer program instructions are stored and which, when processed by one or more computers, configure those computers to provide such a computer system or any individual component of such a computer system.

In the example implementation described in connection with FIGS. 1 through 5, there can be two applications, one for building classifiers (e.g., a training processing module), and another for using a trained classifier for responding to conversational inputs (e.g., an input processing module). Each of these applications may be comprised of multiple applications implementing different components of the application. Each application can be designed to execute on a separate platform (e.g., a computer with an operating system that manages access to resources of the computer by applications running on the computer). The computer is implemented as described in connection with FIG. 6 below.

Figure 6:
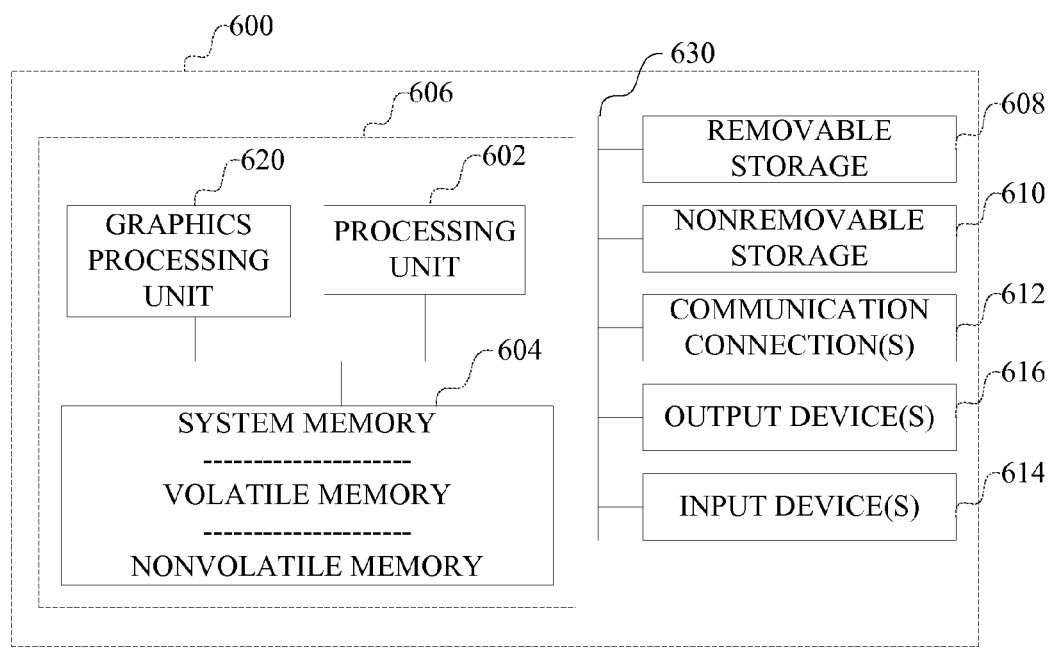
FIG. 6 is a block diagram of an example computer with which components of such a system can be implemented.

FIG. 6 illustrates an example computer with which the various components of the system of FIGS. 1-5 can be implemented. The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, network PCs, minicomputers, mainframe computers, and distributed computing environments that include any of the above types of computers or devices, and the like.

With reference to FIG. 6, an example computer 600 includes at least one processing unit 602 and memory 604. The computer can have multiple processing units 602. A processing unit 602 can include one or more processing cores (not shown) that operate independently of each other. Additional co-processing units, such as graphics processing unit 620, also can be present in the computer. The memory 604 may be volatile (such as dynamic random access memory (DRAM) or other random access memory device), non-volatile (such as a read-only memory, flash memory, and the like) or some combination of the two. This configuration of memory is illustrated in FIG. 6 by dashed line 606. The computer 600 may include additional storage (removable and/or non-removable) including, but not limited to, magnetically-recorded or optically-recorded disks or tape. Such additional storage is illustrated in FIG. 6 by removable storage 608 and non-removable storage 610. The various components in FIG. 6 are generally interconnected by an interconnection mechanism, such as one or more buses 630.

A computer storage medium is any medium in which data can be stored in and retrieved from addressable physical storage locations by the computer. Computer storage media includes volatile and nonvolatile memory, and removable and non-removable storage media. Memory 604 and 606, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 600 may also include communications connection(s) 612 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 612 are devices, such as a network interface or radio transmitter, that interface with the communication media to transmit data over and receive data from communication media.

Computer 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here. The input and output devices can be part of a housing that contains the various components of the computer in FIG. 6, or can be separable from that housing and connected to the computer through various connection interfaces, such as a serial bus, wireless communication connection and the like. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 610, communication connections 612, output devices 616 and input devices 614 can be integrated within a housing with the rest of the computer, or can be connected through input/output interface devices on the computer, in which case the reference numbers 810, 812, 814 and 816 can indicate either the interface for connection to a device or the device itself as the case may be.

Each component (which also may be called a "module" or "engine" or the like), of a system such as described in FIGS. 1-5 above, and which operates on a computer, can be implemented using the one or more processing units of one or more computers and one or more computer programs processed by the one or more processing units. A computer program includes computer-executable instructions and/or computer-interpreted instructions, such as program modules, which instructions are processed by one or more processing units in the one or more computers. Generally, such instructions define routines, programs, objects, components, data structures, and so on, that, when processed by a processing unit, instruct the processing unit to perform operations on data or configure the processor or computer to implement various components or data structures. Such components have inputs and outputs by accessing data in storage or memory and storing data in storage or memory.

This computer system may be practiced in distributed computing environments where operations are performed by multiple computers that are linked through a communications network. In a distributed computing environment, computer programs may be located in both local and remote computer storage media.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

It should be understood that the subject matter defined in the appended claims is not necessarily limited to the specific implementations described above. The specific implementations described above are disclosed as examples only.

What is claimed is:

1. A process for training a computer-implemented classifier to classify conversational inputs into a conversation type, wherein the classifier has an input receiving data representing a conversational input and an output providing a match output indicating how the conversational input matches the conversation type represented by the classifier, the process for training the classifier being performed by a processing system comprising a processor and computer storage, the process comprising:
   receiving, into the computer storage, data representing a first set of conversational inputs and including first label data indicating the first set as positive examples of the conversation type, and data representing a second set of conversational inputs and including second label data indicating the second set as negative examples of the conversation type;
   building the classifier using the data representing the first and second sets of conversational inputs and the first label data and the second label data;
   accessing, from the computer storage, a data representing a third set of conversational inputs;
   for each conversational input in the third set of conversational inputs:
      applying the data representing the conversational input to the inputs of the classifier to obtain a match output from the output of the classifier, and
      in response to a determination that the match output indicates no classification of the conversational input as one of a negative example or a positive example:
         presenting the conversational input through one or more user computers to one or more individuals for labeling,
         receiving third label data through the one or more user computers from the one or more individuals for the presented conversational input, and
         storing the received third label data in association with the conversation input in the computer storage; and
   retraining the classifier using the data representing the third set of conversational inputs having the third label data.

2. The process of claim 1, further comprising:
   receiving and storing in the computer storage, from one or more of the one or more individuals, data representing conversational responses for the conversation type associated with the classifier for which the one or more individuals performed the labeling.

3. The process of claim 1, further comprising:
   identifying additional conversation types from the corpus data representing the third set of conversational inputs.

4. The process of claim 3, wherein identifying comprises:
   clustering conversational inputs in the data representing the third set of conversational inputs;
   assigning a different conversation type to each cluster.

5. The process of claim 3, wherein identifying comprises:
   applying the conversational inputs to a plurality of classifiers;
   identifying the conversational inputs for which none of the plurality of classifiers indicates a match;
   assigning one or more new conversation types to the identified conversational inputs.

6. The process of claim 1, wherein the conversation type of a classifier is included in a hierarchy of conversation types.

7. The process of claim 1, further comprising automatically clustering the data representing the third set of conversational inputs to provide class information for the conversational inputs.

8. The process of claim 1, wherein building the classifier comprises:
   defining, with the processing system, a set of parameters for a metric applied by the classifiers to data applied to the inputs of the classifier.

9. The process of claim 8, wherein the metric applied by the classifier comprises computer program instructions processed by a processor to compute a similarity metric or distance metric or probability metric using the data applied to the inputs to the classifier according to the set of parameters.

10. The process of claim 1, wherein the data representing a conversational input in the first, second and third sets of conversation inputs comprises a plurality of features derived from the conversational input.

11. A computer system comprising:
   a processing system comprising a processor and computer storage;
   a classifier to classify conversational inputs into a conversation type, wherein the classifier has an input receiving data representing a conversational input and an output providing a match output indicating how the conversational input matches the conversation type represented by the classifier;
   the computer storage storing data representing a first set of conversational inputs and including first label data indicating the first set as positive examples of the conversation type, and data representing a second set of conversational inputs and including second label data indicating the second set as negative examples of the conversation type;
   a training module to build the classifier using the data representing the first and second sets of conversational inputs and the first label data and the second label data and configured to:
      access, from the computer storage, data representing a third set of conversational inputs;
      for each conversational input in the third set of conversational inputs:
         apply the data representing the conversational input to the inputs of the classifier to obtain a match output from the output of the classifier, and
         in response to a determination that the match output indicates no classification of the conversational input as one of a negative example or a positive example:
            present the conversational input through one or more user computers to one or more individuals for labeling,
            receive third label data through the one or more user computers from the one or more individuals for the presented conversational input, and
            store the received third label data in association with the conversation input in the computer storage; and
      retrain the classifier using the data representing the third set of conversational inputs having the third label data.

12. The computer system of claim 11, wherein the training module is further configured, for building the classifier, to define a set of parameters for a metric applied by the classifiers to data applied to the inputs of the classifier.

13. The computer system of claim 12, wherein the metric applied by the classifier comprises computer program instructions processed by a processor to compute a similarity metric or distance metric or probability metric using the data applied to the inputs to the classifier according to the set of parameters.

14. The computer system of claim 11, wherein the data representing a conversational input in the first, second and third sets of conversation inputs comprises a plurality of features derived from the conversational input.

15. The computer system of claim 11, wherein the training module is further configured to receive and store in the computer storage, from one or more of the one or more individuals, data representing conversational responses for the conversation type associated with the classifier for which the one or more individuals performed the labeling.

16. The computer system of claim 12, wherein the training module is further configured to identify an additional conversation type based on processing the data representing the third set of conversational inputs.

17. The computer system of claim 16, to identify an additional conversation type, the training module is further configured to:
cluster conversational inputs in the third set of conversational inputs into clusters based on the data representing the third set of conversational inputs; and
assign a conversation type to each cluster.

18. The computer system of claim 16, to identify an additional conversation type, the training module is further configured to:
apply the data representing the third set of conversational inputs to a plurality of classifiers;
identify conversational inputs for which none of the plurality of classifiers indicates a match; and
assigning one or more new conversation types to the identified conversational inputs.

19. The computer system of claim 11, wherein the conversation type of a classifier is included in a hierarchy of conversation types.

20. The computer system of claim 11, wherein the training module is further configured to automatically cluster the third set of conversational inputs to provide class information for the conversational inputs.

* * * * *